United States Patent [19]

Quantz

[11] Patent Number: 4,629,966
[45] Date of Patent: Dec. 16, 1986

[54] DUAL CURRENT LIMITING VOLTAGE REGULATOR

[75] Inventor: Chester Quantz, Valley Mills, Tex.

[73] Assignee: Electro-Tech, Inc., Westland, Mich.

[21] Appl. No.: 670,167

[22] Filed: Nov. 13, 1984

[51] Int. Cl.⁴ .................... H02P 9/30; H02J 7/14
[52] U.S. Cl. ............................ 322/25; 322/28; 322/73
[58] Field of Search .............. 322/25, 27, 28, 99, 322/39, 73; 320/64

[56] References Cited

U.S. PATENT DOCUMENTS

| | | | |
|---|---|---|---|
| 3,296,516 | 1/1967 | Paine, II et al. | 322/25 X |
| 3,350,619 | 10/1967 | Jensen | 322/25 X |
| 3,544,881 | 12/1970 | Raver et al. | 322/25 |
| 3,659,188 | 4/1972 | Alexander et al. | 322/73 X |
| 3,663,946 | 5/1972 | Iwaki | 322/25 X |
| 4,152,635 | 5/1979 | Scott, Jr. | 320/23 |
| 4,217,533 | 8/1980 | Van Beek | 320/23 |
| 4,233,553 | 11/1980 | Prince, Jr. et al. | 320/23 |
| 4,270,080 | 5/1981 | Kostecki | 320/24 |
| 4,308,493 | 12/1981 | Köthe et al. | 320/35 |
| 4,335,344 | 6/1982 | Gant | 322/25 |
| 4,360,772 | 11/1982 | Voss | 322/90 X |

Primary Examiner—R. J. Hickey
Attorney, Agent, or Firm—Krass and Young

[57] ABSTRACT

A voltage regulator for use with a source, such as a generator, and a load, such as a battery for limiting the current delivered by the source to the load at one of a plurality of selectable current limit levels. The regulator comprises a regulation circuit, an over voltage protection circuit and a current limiting circuit. The current limiting circuit includes a shunt resistor to sense the current flowing between the source and the load and a switch to permit selection of a single limit level from the plurality of limit levels. The switch may be manually or automatically controlled. The current is limited by generating an over current signal to the over voltage circuit which, in response, reduces the output of the source.

1 Claim, 1 Drawing Figure

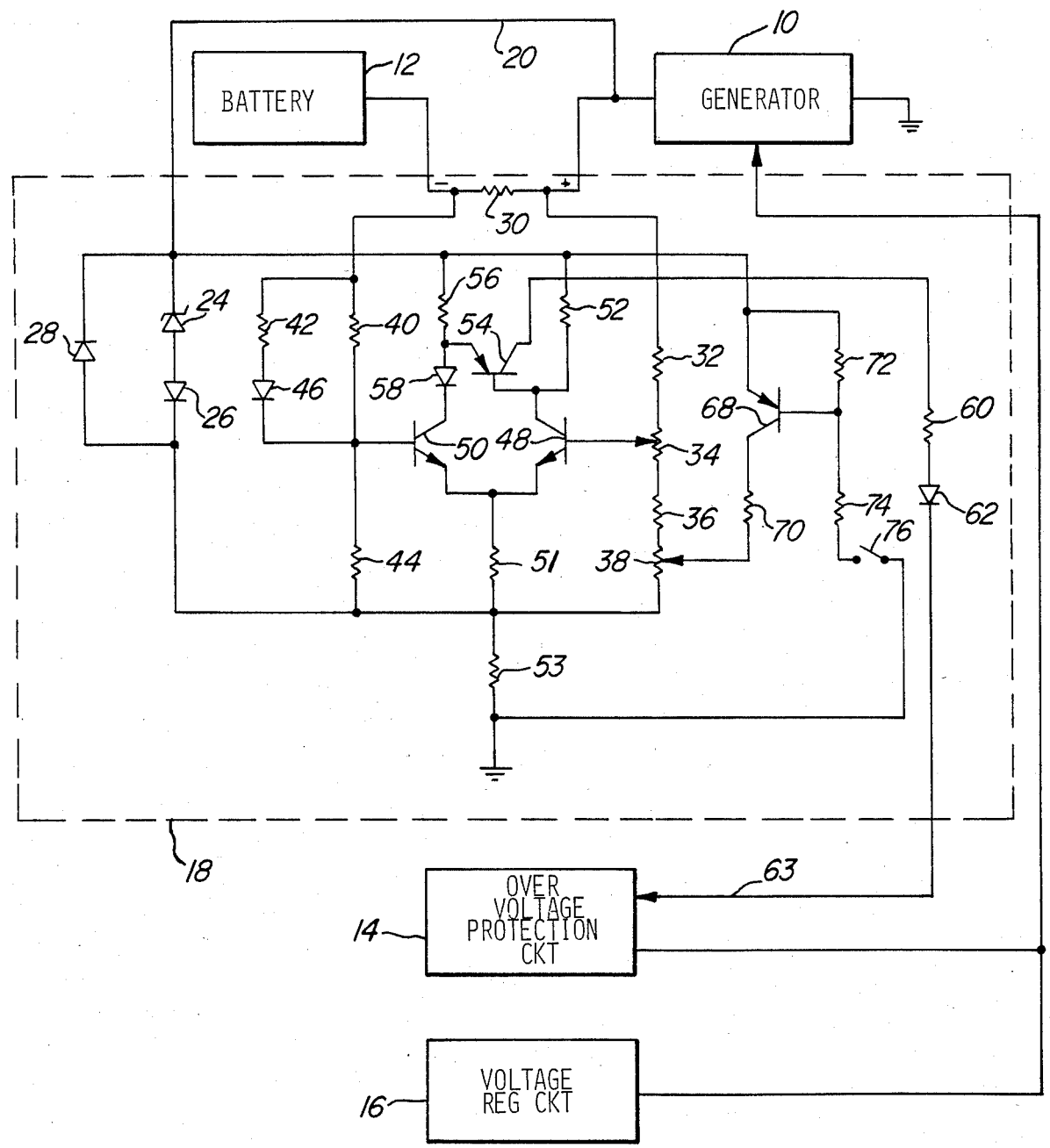

DUAL CURRENT LIMITING VOLTAGE REGULATOR

TECHNICAL FIELD

This invention relates to voltage regulators and, more particularly, to current limiting circuits for use with such voltage regulators.

BACKGROUND OF THE INVENTION

It is well known to use voltage regulators in association with voltage and current sources to regulate the output of those sources before delivery to a load. One common application of voltage regulators is in motor vehicles. Typically, in this instance the voltage regulator is connected between a generator and a battery to ensure that the voltage delivered to the battery remains at a constant level. To keep the voltage at the desired level, the voltage regulator includes regulation circuitry, and often, over voltage protection circuitry. Some voltage regulators additionally include current limiting circuits which limit the current flow from the generator to the battery to assure that the battery is not subjected to excessive current levels. Current limiting is especially important in heavy-duty voltage regulators such as those used for construction equipment or by the military.

The current limiting circuits used in prior art voltage regulators limit the current to a predetermined maximum level which is chosen based on the needs of vehicle in which the voltage regulator will be employed. The current limit is set at a single point and the regulator thereafter limits the current at that predetermined level. While this procedure is satisfactory for regulators which are intended for use in a specific class of vehicles or applications, the voltage regulators are not interchangeable with regulators in other classes of vehicles or applications which often have different current requirements. Consequently, different regulators must be stocked for different needs.

It is desirable to have a voltage regulator which may be installed in a number of different vehicles by simply and easily selecting the appropriate current limit level prior to or even after installation. In military applications, where vehicles may have both a main generator and a back-up generator which provide current at different levels, it is desirable to provide a voltage regulator which can limit the current at a selected one of a plurality of current limits so that a single voltage regulator may be used in the vehicle, the required current limit being selectable by the vehicle operator or automatically.

SUMMARY OF THE INVENTION

The present invention provides a voltage regulator having a current limit circuit which limits the current at a selected one of a plurality of levels. Such a regulator may be used, for example, in a vehicle which has both a main generator and a backup auxiliary generator. When the regulator is connected to the main generator, the current can be limited at a first, relatively high level. When the regulator is connected to the auxiliary generator, the current is limited at a relatively lower level because the current output to the generator is typically reduced. The selection of the appropriate current limit level may be made manually or automatically.

The voltage regulator of the present invention comprises a voltage regulating circuit to regulate the voltage supplied from the generator to the battery, an over voltage protection circuit for reducing the voltage level supplied to the battery when the generator is above a predetermined maximum level, and a current limiting circuit. The current limiting circuit includes a shunt means connected between a source, for example a generator, and a load, for example a battery for sensing the amount of current flowing from the source to the load. In the preferred embodiment, The current limiting circuit is connected to the over voltage protection circuit to limit the output of the source in case the current level is above a selected current limit. The current limit is selectable between at least two different current limit levels by means of a switch which can be manually operated or automatically controlled. Activation of the switch to change the current limit level enables the voltage regulator to limit the current to the load at at least a first or second selected level.

Further objects and advantages of the present invention will become apparent from the detailed description of the invention taken together with the accompanying drawing.

BRIEF DESCRIPTION OF THE DRAWING

The FIGURE is a partially schematic, partially block diagram of a preferred embodiment of the voltage regulator of the present invention.

DETAILED DESCRIPTION OF THE INVENTION

The FIGURE illustrates the preferred embodiment of the voltage regulator as used in conjunction with a generator 10 which provides a charging current to a battery 12. In a typical application, the generator 10 is driven by the motor (not shown) of a motor vehicle and supplies operating power to the electrical components of the vehicle in addition to charging the battery 12.

The voltage regulator comprises an over voltage protection circuit 14, a voltage regulating circuit 16, and a current limiting circuit 18. The over voltage protection circuit 14 and the voltage regulating circuit 16 may be conventional and such circuits are well known in the art. The over voltage circuit 14 operates to reduce the voltage output of the generator 10 whenever the output voltage of generator 10 exceeds a predetermined maximum voltage. The voltage regulating circuit 16 regulates the voltage output of generator 10 so that a constant voltage is applied at the input of battery 12. Over voltage protection circuit 14 overrides the output of voltage regulation circuit 16 whenever an excessive voltage is produced by generator 10.

The generator 10 provides an operating voltage for the current limiting circuit 18 via connection 20. The voltage supplied to operate the components of current limiting circuit 18 is maintained at a constant level by a combination of zener diode 24 and diode 26. The voltage responses of zener diode 24 and diode 26 fluctuate with change in temperature but each responds oppositely to such change and the fluctuation of one cancels the fluctuation of the other. The result is a power supply which remains consant with temperature change. Diode 28 provides reverse polarity protection.

To sense the current flow between the generator to the battery, a shunt resistor 30 is connected between the generator and battery 12. In the preferred embodiment, the shunt resistor is a temperature compensated resistor of a type commercially available. For example, it may comprise Copel resistance material which has virtually no change in electrical property with temperature. Use of a temperature compensated shunt resistor ensures the accuracy of the sensing function since the resistance of the shunt will not vary with temperature.

The positive side of shunt resistor 30 is connected to a voltage dividing resistor network made up of resistors 32 and 36 and potentiometers 34 and 38. The minus side of shunt resistor 30 is connected to voltage dividing network consisting of resistors 40, 42 and 44 and diode 46. The wiper arm of potentiometer 34 is connected to the base of NPN transistor 48. The emitter of transistor 48 is connected to the emitter of a corresponding NPN transistor 50. The emitters of transistors 48 and 50 are also connected to ground via resistors 51 and 53. The base of transistor 50 is connected to the junction of the voltage dividing network connected to the negative side of shunt resistor 30. In the preferred embodiment, transistors 48 and 50 are included in an MD 3410 dual transistor IC.

The collector of transistor 50 is connected to the current limit circuit's power supply through a resistor 56 and diode 58. The collector of transistor 48 is connected to the current limiting circuit's power supply through resistor 52. The collector of transistor 48 is also connected to the base of PNP transistor 54. The emitter of transistor 54 is connected to the junction between resistor 56 and diode 58. The collector of transistor 54 is connected to the over voltage protection circuit 14 via resistor 60, diode 62 and lead 63. The combination of transistors 48, 50 and 54 serve to limit the output of the generator 10 in response to an overcurrent condition as will be described below.

The current limiting circuit 18 is also provided with a circuit which allows for selection of the current limit level between a first or second current limit. The circuit includes switch 76, voltage dividing resistors 72 and 74, and transistor 68 which is connected, via resistor 70, to potentiometer 38 of the voltage dividing network attached to the positive side of shunt resistor 30. The emitter of transistor 68 is connected to the power supply of the current limiting circuit 18. The base of transistor 68 is connected to the center of the voltage divider comprising resistors 72 and 74. This voltage divider is connected between the power supply of the current limiting circuit 18 and switch 76. The switch 76 may be operated to connect the base of transistor 68 to ground thru resistor 74. By opening or closing switch 76, a first or second current limit may be selected, respectively.

In operation, current from the generator 10 flows through shunt resistor 30 to the battery 12. The shunt resistor has a relatively low resistance so that the voltage drop across the resistor is in the millivolt range. Potentiometer 34 is calibrated to select a first, maximum current limit for the voltage regulator. Potentiometer 38 is also set to select a second, lower current limit. Assuming that the switch 76 is open, i.e., that the first current limit level has been chosen, the voltage at the base of transistor 68 is high keeping the transistor off. Consequently, current does not flow through resistor 70. Resistor 70 is therefore not connected in parallel with, and does not affect, the voltage dividing circuit connected to the positive side of shunt resistor 30.

When the current through shunt resistor 30 is below the selected current limit, the voltage at the base of transistor 48 will be below the threshold voltage, selected by adjusting potentiometer 34, required to turn that transistor on. Since the emitters of transistors 48 and 50 are connected together, the response of transistor 50 will be complementary to that of transistor 48. When transistor 48 is off, transistor 50 is on and vice-versa. Since transistor 48 is off when the voltage across shunt 30 is below the selected limit, transistor 50 is on and current flows through resistor 56 and diode 58 to ground via transistor 50 and resistors 51 and 53. In addition, when transistor 48 is off, transistor 54 receives a relatively high voltage at its base, through resistor 52, keeping transistor 54 turned off. As a result, no signal is sent on lead 63 to over voltage protection circuit 14.

If the current through resistor 30 begins to increase above the selected limit, the voltage across the voltage dividing network connected to the positive side of shunt resistor 30 will increase, increasing the voltage at the base of transistor 48. Transistor 48 will begin to turn on. In response, transistor 50 will begin to turn off. As transistor 48 turns on, current begins to flow through resistor 52 to ground. This lowers the voltage at the base of transistor 54 and causes transistor 54 to begin to turn on. Current then begins to flow through transistor 54 to lead 63 which provides a signal to the over voltage protection circuit 14. This signal effectively raises the voltage sensed by the over voltage circuit 14. In response, the over voltage protection circuit begins to reduce the output of the generator 10 in a manner well known in the art.

If the current through shunt resistor 30 continues to rise, transistor 48 will turn on even further causing transistor 54 to turn on further thus generating a larger signal to over voltage protection circuit 14. Over voltage circuit 14 will respond by reducing the output of generator 10 even further. If the current through shunt resistor 30 decreases, transistor 48 begins to turn off. This reduces the voltage at the base of transistor 54, reducing the signal on lead 63. Over voltage protection circuit 14 will then allow the generator output to increase. The current output of the generator is thereby regulated at a first limit level predetermined by adjusting potentiometer 34.

If the current is to be limited at the second current limit level, switch 76 is closed. The voltage divider consisting of resistors 72 and 74 is thereby connected to ground. This lowers the voltage at the base of transistor 68 turning transistor 68 on. As a result, resistor 70 is effectively placed in parallel with the voltage divider attached to the positive side of shunt resistor 30 lowering the effective voltage of the voltage divider network. As a result, it takes a lower level of current through shunt resistor 30 to reach the threshold voltage of transistor 48. Consequently, transistor 48 will turn on at a lower current level than when switch 76 was open. In all other respects, the current limit circuit operates in the same manner as when the first limit level was selected. The second limit level is predetermined by adjusting potentiometer 38.

Although only two current limit levels are disclosed in the preferred embodiment, any number of different current limit levels can be used and selected, for example, by chaining a series of switches and transistor networks similar to those used in the preferred embodiment. In addition, the switch 76 may be activated either manually or automatically depending upon the type of system in use. For example, if an auxiliary generator is automatically activated in the event of a failure of a main generator, switch 76 can be connected so that it automatically closes when the auxiliary generator is in operation. These and other modifications to the preferred embodiment will be apparent to and may be made by those skilled in the art without departing from the spirit and scope of the following claims.

I claim:

1. The current sensing control device for producing a control signal for application to a overvoltage protection circuit for a generator comprising:

resistor means adapted to be connected between said generator and a load to be protected for developing a voltage representing generator output current;

a proportional control means including first and second proportionally and complementally conducting transistors, first means connecting one side of said resistor means to the first of said complemental transistors to establish a bias therefor, second means including at least a first voltage forming circuit element connecting the other side of said resistor means to the second of said complemental transistors to provide a variable bias to said second transistor to cause said second transistor to conduct increasingly from a first threshold value over a predetermined range;

a third proportionally conducting transistor connected between said first and second transistors for developing a control signal which varies in magnitude according to the relative conductances of said first and second transistors;

means connecting the control signal to an overvoltage protection circuit;

a second voltage forming circuit element; and switch means for selectively connecting said second voltage forming circuit element in and out of circuit with said first voltage forming circuit element to vary the threshold point of conductance of said second transistor.

* * * * *